US005972488A

United States Patent [19]

Nagata et al.

[11] Patent Number: 5,972,488

[45] Date of Patent: Oct. 26, 1999

[54] OPAQUE QUARTZ GLASS AND PROCESS FOR PRODUCTION THEREOF

[75] Inventors: Hiroya Nagata, Kanagawa; Koji Tsukuma; Masayuki Kudo, both of Tokyo, all of Japan

[73] Assignee: Tosoh Corporation, Yamaguchi, Japan

[21] Appl. No.: 08/887,967

[22] Filed: Jul. 3, 1997

[30] Foreign Application Priority Data

Jul. 4, 1996 [JP] Japan .................................... 8-174596
Sep. 26, 1996 [JP] Japan .................................... 8-254351

[51] Int. Cl.[6] ...................................................... B32B 17/00

[52] U.S. Cl. .................................... 428/304.4; 428/312.6; 428/398; 428/426; 428/446; 65/17.3; 65/22; 65/32.1; 501/84

[58] Field of Search ............................. 65/17.3, 22, 32.1; 501/84; 428/426, 304.4, 312.6, 398, 446

[56] References Cited

U.S. PATENT DOCUMENTS 5,585,173 12/1996 Kamo .................................. 428/304.4
5,736,206 4/1998 Englisch ................................ 428/34.6
5,772,714 6/1998 Sato ......................................... 65/175

*Primary Examiner*—Timothy Speer
*Attorney, Agent, or Firm*—Sughrue, Mion, Zinn, Macpeak & Seas, PLLC

[57] ABSTRACT

Opaque quartz glass is provided which contains gas bubbles uniformly dispersed therein and is excellent in high-temperature viscosity and heat-insulating property. The opaque quartz glass has a defined apparent density, contains bubbles having a defined average bubble diameter in a defined amount, has a defined total bubble sectional area, generally exhibits a defined linear transmittance at a thickness of 1 mm or larger to projected light of a defined wavelength and contains nitrogen in a defined concentration. The opaque quartz glass is produced by a process comprising packing into a mold a powdery source material of powdery silica having a defined average particle diameter and powdery silicon nitride dispersed therein in a defined amount, heating the powdery source material to one of two first defined temperature ranges (both under vacuum) and further heating the source material up to a second temperature higher than the melting point and not higher than 1900° C. in a vacuum or an inert gas atmosphere for vitrification and bubble formation.

5 Claims, No Drawings

OPAQUE QUARTZ GLASS AND PROCESS FOR PRODUCTION THEREOF

BACKGROUND OF THE INVENTION

1. Field of the Invention

The present invention relates to opaque quartz glass, particularly to opaque quartz glass which is excellent in heat insulation, and adhesiveness to transparent quartz glass. The present invention relates also to a process for producing the quartz glass.

2. Description of the Related Art

Conventionally, opaque quartz glass is produced by heat-fusion of powdery silicate as the source material for vitrification. The process of the heat-fusion includes a Bernoulli process in which the source material is fused in a flame such as an argon-oxygen plasma flame, and oxyhydrogen flame; and a vacuum fusion process in which silica packed in a container is heated and fused under a high vacuum. The opaque quartz glass is produced conventionally from natural silica rock or low-quality quartz as the source material. Such source materials contain many fine air bubbles which remain in the fused matter to give opaque quartz glass. In recent years, with the progress in integration of LSI in the semiconductor industry, the requirement for higher purity of the employed source material is becoming severer, and high-purity source materials have come to be used even in the fields in which the use of low-purity source materials has been conventional. A typical example is a flange material, for which opaque and pure quartz glass, namely high-purity opaque quartz glass, is demanded. However, the conventional natural source material for opaque quartz glass contains a large amount of impurities together with the fine bubbles. The removal of the impurities from the source material is extremely difficult, and refinement of the source material for high purity is considered to be impossible. On the other hand, quartz of relatively high purity, which contains less air bubbles, in particular, fine air bubbles in a smaller amount, does not increase its opacity on fusion and produces translucent quartz glass.

An improved process therefor is disclosed in which high-purity amorphous silica containing a lesser amount of elements of alkali metals, alkaline earth metals, Fe, and Al, containing many fine air bubbles, and containing silanol groups as a gasifiable component uniformly in a specified concentration range is fused in a flame (JP-A-6-24771). This process is applicable only to production of quartz glass products in a simple shape such as a base ingot for an IC-sealing silica filler and for silica glass powder, but is not suitable for production of quartz glass products in a complicated shape such as flanges, cylinders, hollow square prisms, screws, turbo-chargers, a cubic water container or a wash basin because of the necessity of post-machining such as cutting in a larger amount, resulting low utilization efficiency of the quartz glass and rise of the production cost.

Another process for opaque quartz glass is disclosed in which highly purified powdery crystalline quartz is ammoniated by heating in an ammonia atmosphere and fusing in an inert gas atmosphere to incorporate a larger number of smaller bubbles to increase the total bubble sectional area and to improve heat resistance (JP-A-7-61827, and JP-A-7-300341). However, in this process, the density, bubble diameter, and the amount of the bubbles depend greatly on the particle size, the particle size distribution, and the packing state of the powdery source material, so that the bubble diameter cannot readily be controlled with reproducibility, and the bubble diameter and the bubble amount vary significantly from the surface to the interior disadvantageously. Further, the produced quartz glass contains nitrogen element at a high content. This nitrogen will be liberated from the glass substrate in a process of repairing of defects of the quartz glass article by flame working, causing undesirable change of the dimension or the appearance such as surface roughness and opacity change at the repaired portion. Furthermore, this opaque quartz glass cannot be joined to a transparent quartz glass member by flame welding because of large difference in the nitrogen element content.

Other processes for opaque quartz glass are disclosed in which fine powder of a material such as carbon and silicon nitride is added as a blowing agent to the silica source material such as silica rock, silica sand, α-quartz, and cristobalite (e.g., JP-A-4-65328). However, such processes are not suitable for semiconductor manufacturing jigs or the like used at a high temperature for long time, because OH groups can be incorporated into the glass in fusion by oxyhydrogen flame, resulting in a lower viscosity at high temperatures, although the disadvantages of the aforementioned processes are offset. Moreover, in these processes, uniform dispersion of the fine gas bubbles in the fusion is not readily achievable since the process includes mixing of solid particles and reactions or decomposition in a solid phase. In the flame-fusion process, since the fine particles stay in the flame for an extremely short residence time, the reaction tends to be incomplete, and the added blowing agent may remain as an impurity in the fused matter, or the fused matter may be colored by reaction of the silicate source material with the blowing agent.

As discussed above, any of the aforementioned prior art involve various unsolved problems.

The present invention has been accomplished to solve the above problems of the prior art.

SUMMARY OF THE INVENTION

An object of the present invention is to provide opaque quartz glass which contains bubbles uniformly dispersed therein and is excellent in high-temperature viscosity and heat-insulating property.

Another object of the present invention is to provide a process for producing the opaque quartz glass.

The opaque quartz glass of the present invention can be worked directly into an article having a complicated shape such as a flange, a cylinder, a hollow prism, a screw, and a turbo-charger, a cubic water container or a wash basin. The opaque quartz glass of the present invention, when it is damaged, can be repaired by flame working without liberation of nitrogen gas from the glass substrate with smoothness of the repaired surface. The opaque quartz glass of the present invention can be joined by flame welding to transparent quartz glass members owing to the approximate nitrogen element contents thereof.

The process for producing the opaque quartz glass of the present invention is analogous to the aforementioned process (JP-A-4-65328) of fusion of fine powdery silicate source material such as silica rock, silica sand, α-quartz, and cristobalite with a fine powder of carbon, silicon nitride, or the like as a blowing agent.

According to an aspect of the present invention, there is provided opaque quartz class having an apparent density ranging from 1.7 to 2.1 g/cm$^3$, containing bubbles having an average bubble diameter ranging from 10 to 100 μm in an amount ranging from $3\times10^5$ to $5\times10^6$ bubbles/cm$^3$, and having a total bubble sectional area ranging from 10 to 40 cm$^2$/cm$^3$.

According to another aspect of the present invention, there is provided a process for producing opaque quartz glass, comprising packing, into a heat-resistant mold having a complicated shape, a powdery source material composed of powdery silica having an average particle diameter ranging from 10 to 500 $\mu$m and powdery silicon nitride dispersed therein in an amount ranging from 0.001 to 0.05 part by weight based on 100 parts by weight of the powdery silica; heating the powdery source material up to a temperature of not lower than 1400° C. and lower than the melting temperature thereof in a vacuum atmosphere in an electric furnace; further heating the source material up to another temperature higher than the melting point and not higher than 1900° C. in a vacuum atmosphere or an inert gas atmosphere in an electric furnace for vitrification and bubble formation.

By this process, the formed glass contains the bubbles distributed uniformly therein, and is excellent in high-temperature viscosity and heat-insulating property, and can be obtained directly in a complicated shape approximate to the intended final product such as a flange, a cylinder, a hollow prism, a screw, and a turbo-charger, a cubic water container or wash basin by selecting the shape of the heat-resistant mold without conducting complicated powder molding such as cast molding.

DETAILED DESCRIPTION OF THE PREFERRED EMBODIMENT

The present invention is described below in more detail.

[1] Source Material

The source material is a mixture of powdery silica and powdery silicon nitride.

(a) Powdery Silica

The powdery silica employed in the present invention is preferably powder of high-purity crystalline or amorphous silica containing metallic impurities of Na, K, Mg, Ca, and Fe at a content respectively of not higher than 1 ppm to prevent vaporization of the impurity caused by heating the opaque quartz glass produced by the process of the present invention, to prevent partial crystallization of the opaque quartz glass to cause brittleness, or to prevent color development. Such pure powdery silica can be obtained by synthesis, or purification of a natural source material. For example, the processes of synthesis of powdery amorphous silica include the process in which an aqueous alkali silicate solution (water glass) is reacted with an acid to remove the alkali metal; the process in which $SiCl_4$ is hydrolyzed to form silica; and the process in which a silicon alkoxide is hydrolyzed to form silica. For industrial scale production, the process employing the reaction of an alkali metal silicate (water glass) composed of an alkali metal such as Na, K, and Li and silicon dioxide with an inorganic acid such as sulfuric acid, nitric acid, and hydrochloric acid is suitable. The natural source material includes natural quartz, which is treated with hydrofluoric acid to obtain powdery crystalline silica.

The average particle diameter of the powdery silica is preferably in the range of from 10 to 500 $\mu$m for fluidization for packing into a heat-resistant mold. The powdery silica of the average particle diameter of less than 10 $\mu$m exhibits low powder fluidity, not being readily packed uniformly into the mold, whereas the one of the average particle diameter of 500 $\mu$m or larger results in larger void in the packed matter to undesirably cause development of huge bubbles of 300 $\mu$m or larger in the opaque quartz glass.

The bubble diameter in the opaque quartz glass of the present invention depends on the average particle diameter of the powdery silica, so that the bubble diameter can be controlled by adjusting the average particle diameter. In other words, finer bubbles can be obtained by use of the powdery silica of finer particles, and coarser bubbles can be obtained by use of the powdery silica of coarser particles.

(b) Powdery Silicon Nitride

The powdery silicon nitride is preferably of high purity, and can be obtained by nitridation of silicon tetrachloride, silicon, silica, and the like. The high purity is preferred to prevent scattering of the impurity from the opaque quartz glass produced by the process of the present invention, to prevent partial crystallization of the opaque quartz glass to cause brittleness, or to prevent color development.

The powdery silicon nitride is employed in an amount ranging from 0.001.to 0.05 part by weight based on 100 parts by weight of the powdery silica. The amount of less than 0.001 parts by weight is not preferred because the heat-insulating property is insufficient owing to the lesser amount of the formed bubbles, whereas the amount of more than 0.05 part by weight is not preferred because the mechanical strength of the opaque quartz glass is undesirably lowered owing to an excessive amount of the formed bubbles. Further, at the amount of more than 0.05 part by weight, the nitrogen content in the quartz glass substrate will exceed 50 ppm, which causes liberation of nitrogen from the quartz glass substrate when it is heated again for flame-working or the like treatment to increase the amount of the bubbles and the diameter of the bubbles to change the whiteness of the opaque quartz glass.

The average particle diameter of the powdery silicon nitride is preferably in the range of from 0.1 to 1, more preferably from 0.1 to 0.5 $\mu$m, because within this range the bubbles do not become coarse, the bubbles are formed in an appropriate amount, and the powdery silicon nitride can be mixed with the powdery silica without aggregation.

[2] Mixing and Dispersion

The degree of dispersion of the powdery silicon nitride in the source material composed of powdery silica and powdery silicon nitride affects the diameters and the diameter distribution of the formed bubbles. Therefore, the powdery silicon nitride should be mixed without aggregate formation. The apparatus for the mixing is not limited, provided that it is capable of dispersing the powdery silicon nitride, the apparatus including mortars and ball mills. For sufficient dispersion of the powdery silicon nitride, a wet mixing process is preferred by using a dispersion medium such as water and alcohols.

[3] Filling into Heat-Resistant Mold

The obtained powder mixture is packed into a heat-resistant mold. The heat-resistant mold is not limited in the construction material and the shape thereof, provided that the object of the present invention can be achieved. The preferred mold-construction material includes carbon, boron nitride, silicon carbide, and the like which does not readily react with the silica. For sufficient slip between the heat-resistant mold and the powder mixture, carbon felt, carbon paper, or the like is preferably employed for filling and heating of the powder. The powder mixture preferably has a filling density in the range of from 0.7 to 1.8 g/cm$^3$ for uniform packing into the heat-resistant mold for uniform formation of bubbles. The shape of the heat-resistant mold is selected without limitation to obtain the opaque quartz glass product in a desired shape since the shape of the glass product after vitrification and bubble formation is substantially the same as the heat-resistant mold.

[4] Vitrification and Bubble Formation

The powder mixture packed in the heat-resistant mold is heated to decompose the silicon nitride component sufficiently and to convert the quartz glass after bubble formation by gas evolution into a complete glass state. The heating treatment may be conducted in an electric furnace, but the heating apparatus is not specially limited, provided that is capable of heating the source material to convert it from the powder state to the glass state. The powder mixture is heated in the heating apparatus at a temperature not lower than the melting temperature of the source material but not higher than 1900° C. The melting temperature of the source material is 1713° C. at atmospheric pressure when amorphous silica powder is used as a source material, but the melting temperature is lower than 1713° C. when powdery quartz is used as a source material. In the case where the source material does not melt at or below the melting temperature thereof, or where the entire or a part of the powdery amorphous silica in the source material has transferred from amorphous silica to crystalline cristobalite and the cristobalite portion remains unmelted, the resulting glass becomes undesirably brittle. Heating at a temperature above 1900° C. is not preferred since the bubbles become coarse to lower the density of the glass and not to give a mechanical strength necessary for machining the glass into a desired shape and dimension. The duration time of the heating treatment is not limited, provided that the source material is entirely melted and vitrified, and depends on the heating temperature. Usually heating for one hour is sufficient.

In the temperature elevation period, the atmosphere is preferably kept under a vacuum until the packed material is converted from the open cell state to a closed cell state. The vacuum atmosphere may be maintained until the packed powder in a closed cell state has been converted to the glass state. The vacuum is preferably 10 mmHg of absolute pressure or lower for keeping, in the closed bubble, only the liberated gas and the decomposition gas of the nitrogen element formed by silicon nitride and silica and dissolved in the source material to distribute the bubbles uniformly throughout the entire glass.

When the packed powder has changed its state from the open cell state to the closed cell state or when the transfer to the glass state has been completed at the heating temperature, the vacuum atmosphere is released and an inert gas is introduced thereto. The inert gas is not especially limited, provided that it does not substantially react with the heat-resistant mold, the source material, and the formed product of the present invention. The inert gas includes nitrogen, argon, and helium. Of these gases, nitrogen and argon are preferred in view of the cost and the gas tightness. The inert gas is introduced usually at an atmospheric pressure to prevent unstable behavior of bubbles in the glass such as expansion and constriction on flame working or re-heating. However, a slight pressure or a slight vacuum may be applied if desired.

[5] Opaque Quartz Glass

The opaque quartz glass obtained from the above process has preferably an apparent density ranging from 1.7 to 2.1 g/cm$^3$, and an average bubble diameter ranging from 10 to 100 $\mu$m for higher mechanical strength, higher workability, and higher precision of the glass face.

In the process of producing the opaque quartz glass of the present invention, the diameter of the closed cell, and the amount thereof depends on the added amount of the powdery silicon nitride, the particle diameter and particle diameter distribution of the powdery silica, the fusion temperature, and the pressure of the introduced gas. For example, the opaque quartz glass having excellent heat-insulating property having an apparent density of 1.95–2.05 g/cm$^3$, an average bubble diameter of 50–70 $\mu$m, and a bubble content of $7\times10^5$–$8\times10^5$ bubbles/cm$^3$ can be obtained under the conditions of the addition of powdery silicon nitride of 0.01–0.02 part by weight (based on 100 parts by weight of powdery silica), the average silica powder particle diameter of 100–200 $\mu$m (particle diameter distribution: 10–600 $\mu$m), the fusion temperature of 1800–1850° C., and the introduced gas pressure of 1.0–2.0 kgf/cm$^2$. The opaque quartz glass having a higher heat-insulating property and a smoother face, having an apparent density of 2.05–2.12 g/cm$^3$ an average bubble diameter of 30–50 $\mu$m, and a bubble content of $1$–$2\times10^6$ bubbles/cm$^3$ can be obtained under the conditions of the addition of powdery silicon nitride of 0.005–0.02 part by weight (based on 100 parts by weight of powdery silica), the average silica powder particle diameter of 50–100 $\mu$m (particle diameter distribution: 10–200 $\mu$m), the fusion temperature of 1750–1850° C., and the introduced gas pressure of 1.0–2.0 kgf/cm$^2$. The governing factor for the bubble formation is the particle size of the powdery silica: a finer particle size of the powdery silica gives opaque quartz silica having bubbles of a smaller diameter, a larger amount of bubbles, and higher heat-insulating property.

The opaque quartz glass thus produced has a white appearance, and is not especially limited otherwise. The opaque quartz glass contains the bubbles dispersed uniformly therein, and the opacity is confirmed by low linear transmittance to the light, for example, of a wavelength ranging from of 300 to 900 nm. To obtain heat-insulating property, the linear transmittance is preferably not higher than 3% at the thickness of the glass of 1 mm or more at the light wavelength range of for 300 to 900 nm.

The opaque quartz glass showing such a low linear transmittance has low thermal conductivity owing to the presence of the bubbles. The heat-insulating property is further amplified by scattering the heat rays by the bubbles. In other words, the heat-insulating property of the opaque quartz glass is improved by lowering the linear light transmittance, or increasing the heat ray scattering.

In the process of the present invention, since no OH group is incorporated into the glass from the source material or in the fusion treatment, the opaque quartz glass is produced which has high viscosity at high temperatures.

EXAMPLES

The present invention is described below in more detail by reference to Examples without limiting the invention. The measurements were conducted as below.

[Impurity Analysis]

The powdery crystalline quartz was analyzed by an ICP method.

[X-ray Diffraction]

The opaque quartz glass was cut by a cutter into a test sample in a size of 20 mm×10 mm×2 mm (thick). The glass state of the test sample was observed by means of an X-ray diffraction apparatus (Model: MXP3, manufactured by McScience Co.). The glass state was confirmed by the presence or absence of the diffraction peak of crystal of quartz, cristobalite, or the like in the obtained diffraction pattern.

[Apparent Density]

The opaque quartz glass was cut by a cutter into a test sample in a size of 30 mm×30 mm×10 mm (thick). The apparent density was measured according to the Archimedes' principle by means of an electronic balance (Model: AT261, manufactured by Metler Co.).

[Mean Bubble Diameter and Bubble Amount]

The opaque quartz glass was cut by a cutter into a test sample in a size of 30 mm×10 mm×0.3 mm (thick). The bubble diameter and the bubble amount in the sample were measured by means of a polarization microscope provided with a scale-graduated lens (Model: BH-2, manufactured by Olympus Optical Co., Ltd.). The average bubble diameter was derived by calculating the total bubble volume by assuming the counted bubbles to be completely spherical calculating the average volume by dividing the total volume by the number of bubbles, and calculating the average diameter from the average volume.

[Particle Diameter]

The particle diameter distribution and the average particle diameter of the powder particles were measured by means of a laser diffraction scattering tester: Coulter LS-130 (produced by Coulter Electronics Co.).

[Packing Density]

The packing density of the powder material was derived by packing a prescribed weight of the powder material into the heat-resistant mold, measuring the volume of the powder material, and dividing the weight of the powder material by the volume thereof.

[Conformation of Cavities]

The quartz glass was cut by a cutting machine. The sectional face was observed visually.

[Light Transmittance]

The quartz glass was cut by a cutting machine, and the both faces of the cut sample perpendicular to the thickness direction were polished with #1200 abrasive alumina grain to prepare a test sample in a size of 30 mm×10 mm×1 mm (thick). The linear transmittance in a thickness direction of the sample was measured at wavelengths of 300 nm, 500 nm, 700 nm, and 900 nm by means of a spectrophotometer (Double Beam Spectrophotometer: Model 220, manufactured by Hitachi, Ltd.).

[Elemental Nitrogen Concentration in Glass Substrate]

The quartz glass was ground sufficiently to a powder state by means of a mortar. The powdery glass was decomposed with nitric acid-hydrofluoric acid, and sulfuric acid under pressure. The decomposition product was separated by distillation, and was subjected to ion chromatography.

[Total Sectional Area]

The total sectional area was defined to be the sum of areas containing diameters of bubbles which are supposed to be perfect spheres, and was calculated by multiplying the mean sectional area derived from the mean bubble diameter by the number of bubbles.

Example 1

Powdery natural quartz crystal (trade name: IOTA-5, supplied by Unimin Co.) having an average particle diameter of 300 μm and a particle diameter distribution in the range of 30 to 500 μm was purified by a known hydrofluoric acid treatment method to prepare a powdery source material (hereinafter referred to as "powdery quartz"). Powdery silicon nitride (trade name: SN-E10, produced by Ube Industries, Ltd., average particle diameter: 0.5 μm) produced from silicon tetrachloride by an ammonia treatment process was employed as another source material component. The powdery silicon nitride was weighed out in a ratio of 0.01 part by weight based on 100 parts by weight of the powdery quartz to be added later. This powdery silicon nitride was dispersed sufficiently in 50 parts by weight of ethanol based on 100 parts by weight of the powdery quartz by stirring and ultrasonic vibration. To the liquid dispersion of the silicon nitride, the aforementioned powdery quartz was added, and the mixture was stirred and mixed sufficiently. Then, the ethanol was removed therefrom by a vacuum evaporator, and the remaining solid matter was dried to obtain a mixture of the powdery quarts and the powdery silicon nitride (hereinafter referred to as a "powder mixture"). 300 Grams of the powder mixture was packed in a carbon crucible (outer diameter: 130 mm, inner diameter: 100 mm, depth: 50 mm) having a carbon felt stuck on the inside wall. The packing density was 1.4 g/cm$^3$. The crucible was placed in an electric furnace. The atmosphere was evacuated to $1\times10^{-3}$ mmHg, and the temperature was elevated from room temperature up to 1800° C. at a temperature elevation rate of 300° C. per hour, and was kept at 1800° C. for 10 minutes. Then, gaseous nitrogen was introduced into the electric furnace to an atmospheric pressure (1 kgf/cm$^2$) , and the heating was finished. The resulting opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

Example 2

The powdery quartz in Example 1 was pulverized by a dry ball mill, and classified by sieves to obtain powdery quartz of an average particle diameter of 50 μm, and a particle diameter distribution in the range of from 10 to 200 μm. With this powdery quartz, a powder mixture was obtained which was composed of 0.03 part by weight of powdery silicon nitride and 100 parts by weight of the powdery quartz. 300 Grams of this powder mixture was packed into the same carbon crucible as in Example 1. The packing density was 1.4 g/cm$^3$. The powder mixture was heat-treated in the same manner as in Example 1 to obtain opaque quartz glass. The opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

Example 3

The powdery quartz in Example 1 was pulverized by a dry ball mill, and classified by sieves to obtain powdery quartz of an average particle diameter of 50 μm, and a particle diameter distribution in the range of from 10 to 200 μm. With this powdery quartz, a powder mixture was obtained under the same conditions as in Example 1.

300 Grams of this powder mixture was packed into the same carbon crucible as in Example 1. The packing density was 1.2 g/cm$^3$. The powder mixture was heat-treated in the same manner as in Example 1 to obtain opaque quartz glass. The opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

Example 4

Opaque quartz glass was prepared in the same manner as in Example 1 except that the heating temperature was raised to 1850° C. The opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

Example 5

Opaque quartz glass was prepared in the same manner as in Example 1 except that, after the heating at 1800° C. for 10 minutes, the nitrogen is introduced to a pressure of 2.0 kgf/cm$^2$ and then the heating was stopped. The opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

Example 6

Powdery amorphous silica (trade name: Silica Ace A, produced by Nitto Chemical Industry Co., Ltd.) produced by reaction of sodium silicate with an acid and heat treatment and having an average particle diameter of 300 $\mu$m and a particle diameter distribution in the range of 50 to 1000 $\mu$m was pulverized by a dry ball mill, and classified by sieves to obtain powdery amorphous silica of an average particle diameter of 180 $\mu$m, and a particle diameter distribution in the range of from 10 to 600 $\mu$m. This powdery amorphous silica was used as a source material component. Powdery silicon nitride (trade name: SN-E10, produced by Ube Industries, Ltd., average particle diameter: 0.5 $\mu$m) produced from silicon tetrachloride by a known ammonia treatment process was employed as another source material component. The powdery silicon nitride was weighed out in a ratio of 0.01 part by weight based on 100 parts by weight of the powdery amorphous silica to be added later. This powdery silicon nitride was dispersed sufficiently in 50 parts by weight of ethanol relative to 100 parts by weight of the powdery amorphous silica by stirring and ultrasonic vibration. To the liquid dispersion of the silicon nitride, the powdery amorphous silica was added, and the mixture was stirred and mixed sufficiently. Then, the ethanol was removed therefrom by a vacuum evaporator, and the remaining solid matter was dried to obtain a mixture of the powdery amorphous silica and the powdery silicon nitride (hereinafter referred to as a "powder mixture"). 300 Grams of the powder mixture was packed in a carbon crucible (outer diameter: 130 mm, inner diameter: 100 mm, depth: 50 mm) having a 2 mm-thick carbon felt stuck on the inside wall. The packing density was 0.81 g/cm$^3$. The crucible was placed in an electric furnace. The atmosphere was evacuated to $1\times10^{-3}$ mmHg, and the temperature was elevated from room temperature up to 1800° C. at a temperature elevation rate of 300° C. per hour, and was kept at 1800° C. for 10 minutes. Then, gaseous nitrogen was introduced into the electric furnace to an atmospheric pressure (1 kgf/cm$^2$) and the heating was finished. The resulting opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

Example 7

A powder mixture was obtained in the same manner as in Example 6 except that the ratio of the powdery silicon nitride was changed to 0.02 part by weight based on 100 parts by weight of the powdery amorphous silica. 300 Grams of this powder mixture was packed into the same carbon crucible as in Example 1. The packing density was 0.81 g/cm$^3$. The powder mixture was heat-treated in the same manner as in Example 1 to obtain opaque quartz glass. The opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

Example 8

A powder mixture was obtained in the same manner as in Example 6 except that the particle size of the powdery amorphous silica was changed to have an average particle diameter of 250 $\mu$m and a particle diameter distribution ranging from 10 to 800 $\mu$m. 300 Grams of the powder mixture was packed into the same carbon crucible as in Example 1. The packing density was 0.79 g/cm$^3$. The powder mixture was heat-treated in the same manner as in Example 1 to obtain opaque quartz glass. The opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

Example 9

Powdery amorphous silica (trade name: MKC Silica PS300L, produced by Mitsubishi Kagaku K.K.) produced by reaction of silicon alkoxide with water and heat treatment and having an average particle diameter of 170 $\mu$m and a particle diameter distribution in the range of 30 to 400 $\mu$m was used as a source material component. Powdery silicon nitride (trade name: SN-E10, produced by Ube Industries, Ltd., average diameter: 0.5 $\mu$m) was weighed out in a ratio of 0.01 part by weight based on 100 parts by weight of the powdery amorphons silica to obtain a powder mixture in the same manner of Example 1. 300 Grams of the powder mixture was packed into the same carbon crucible as in Example 1. The packing density was 0.81 g/cm$^3$. The powder mixture was heat-treated in the same manner as in Example 1 to obtain opaque quartz glass. The opaque quartz glass was confirmed to be in a glass state by X-ray diffraction. The opaque quartz glass was evaluated by the aforementioned methods. The evaluation results are shown in Tables 1–3: apparent density, average bubble diameter, and amount of bubbles in Table 1; total bubble sectional area, and light transmittance in Table 2; and elemental nitrogen content in glass substrate in Table 3.

The samples of the opaque quartz glass obtained in Examples 1–9 were sliced and observed by microscopy. Thereby the bubbles were found to be uniformly dispersed. The samples were heat-treated in an atmosphere of nitrogen at an atmospheric pressure (1 kgf/cm$^2$) at 1800° C. for ten minutes in an electric furnace. The heat-treated samples were sliced and observed by microscopy. The state of the bubbles was found not to be changed by the heat-treatment.

Comparative Example 1

The powdery quartz in Example 1 was pulverized by means of a dry ball mill. The pulverized matter was dispersed in ethanol and classified by sedimentation to obtain powdery quartz having an average particle diameter of 5 μm and a particle diameter distribution ranging from 1 to 10 μm. By use of this powdery quarts, a powder mixture was prepared under the same conditions as in Example 1. 300 Grams of the powder mixture was packed into the same carbon crucible as in Example 1. The packing density was 0.9 g/cm$^3$. The powder mixture was heat-treated in the same manner as in Example 1 to obtain quartz glass. The quartz glass was confirmed to be in a glass state by X-ray diffraction. However, the apparent density of the glass was as low as 1.2 g/cm$^3$. The interior of the glass was examined by cutting, and cavities of 2–5 mm diameter were found to be scattered in the glass.

Comparative Example 2

A powder mixture was prepared in the same manner as in Example 6 except that the powdery amorphous silica material was changed to the one having an average particle diameter of 700 μm and a particle distribution ranging from 500 to 1000 μm. 300 Grams of the powder mixture was packed into the same carbon crucible as in Example 1. The packing density was 0.78 g/cm$^3$. The powder mixture was heat-treated in the same manner as in Example 1 to obtain quartz glass. The quartz glass was confirmed to be in a glass state by X-ray diffraction. However, the apparent density of the glass was as low as 1.4 a/cm$^3$. Cavities of about 0.5–1 mm diameter were found to be scattered in the glass.

Comparative Example 3

Quartz glass was prepared in the same manner as Example 6 except that the heating temperature was changed to 1950° C. The obtained quartz glass was confirmed to be in a glass state by X-ray diffraction. However, the apparent density of the glass was as low as 1.5 g/cm$^3{}_1$ and the average bubble diameter was as large as 200 μm, which render the glass remarkably brittle.

Comparative Example 4

Quartz glass was prepared in the same manner as in Example 1 except that the mixing amount of the powdery silicon nitride was changed to 0.06 part by weight based on 100 parts by weight of the powdery quartz. The obtained quartz glass was confirmed to be in a glass state by X-ray diffraction. However, the apparent density of the glass was as low as 1.7 g/cm$^3$. The elemental nitrogen concentration in the glass substrate is shown in Table 3.

This glass was heat-treated in a nitrogen atmosphere of the atmospheric pressure (1 kg/cm$^2$) at 1800° C. for ten minutes. The whiteness of the glass increased by the heat treatment. The heat-treated glass was sliced and examined by microscopy. The amount of the bubbles and the diameter of the bubbles were found to have increased by the heat treatment.

The opaque quartz glass of the present invention is prepared by heating powdery silica by addition of powdery silicon nitride, and the bubbling is caused by vitrification of the powdery silica and decomposition of the silicon nitride. The opaque quartz glass have advantages below. Contamination of the quartz glass by impurities such as alkali metal is prevented. The bubble diameter and the apparent density of the obtained opaque quartz glass can be controlled by selecting the particle diameter of the powdery silica, the mixing amount of the powdery silicon nitride, and the heating temperature. The glass is obtained in nearly the same shape as the heat-resistant mold, so that the mechanical working steps such as cutting and shaping for the final product shape can be simplified remarkably by vitrification of the powdery source material packed in a heat-resistant mold having a shape similar to the intended product shape. The elemental nitrogen concentration is low in the glass substrate, whereby the change of whiteness of the opaque quartz glass by re-bubbling can be inhibited in re-heating in flame-working, or the like treatment. Joining to transparent quartz glass by flame working can be conducted satisfactorily without denaturing of the respective kinds of glass at the joining portion without danger of breakage since the elemental nitrogen concentration in the both kinds of glass is appropriate.

TABLE 1

| Example | Apparent density (g/cm$^3$) | Average bubble diameter (μm) | Amount of bubbles (bubbles/cm$^3$) |
|---|---|---|---|
| 1 | 2.01 | 74 | $4 \times 10^5$ |
| 2 | 1.82 | 88 | $5 \times 10^5$ |
| 3 | 2.10 | 34 | $2 \times 10^6$ |
| 4 | 1.86 | 90 | $4 \times 10^5$ |
| 5 | 1.97 | 63 | $8 \times 10^5$ |
| 6 | 1.96 | 63 | $8 \times 10^5$ |
| 7 | 1.84 | 72 | $9 \times 10^5$ |
| 8 | 2.05 | 66 | $5 \times 10^5$ |
| 9 | 2.05 | 66 | $5 \times 10^5$ |

TABLE 2

| Example | Total bubble sectional area (cm$^2$/cm$^3$) | Light transmittance (%) 300 nm | 500 nm | 700 nm | 900 nm |
|---|---|---|---|---|---|
| 1 | 18 | 0.7 | 1.3 | 2.0 | 2.7 |
| 2 | 30 | 0.2 | 0.4 | 0.5 | 0.6 |
| 3 | 20 | 0.5 | 1.0 | 1.6 | 2.0 |
| 4 | 26 | 0.3 | 0.5 | 0.6 | 0.8 |
| 5 | 25 | 0.4 | 0.7 | 1.0 | 1.4 |
| 6 | 26 | 0.2 | 0.3 | 0.4 | 0.4 |
| 7 | 34 | 0.2 | 0.3 | 0.3 | 0.4 |
| 8 | 16 | 0.8 | 1.5 | 2.4 | 3.0 |
| 9 | 16 | 0.8 | 1.4 | 2.3 | 2.9 |

TABLE 3

| Example | Elemental nitrogen concentration in glass substrate (ppm) |
|---|---|
| 1 | 15 |
| 2 | 40 |
| 3 | 15 |
| 4 | 15 |
| 5 | 15 |
| 6 | 15 |
| 7 | 32 |

TABLE 3-continued

| | Elemental nitrogen concentration in glass substrate (ppm) |
|---|---|
| 8 | 15 |
| 9 | 15 |
| Comparative example | |
| 4 | 70 |

What is claimed is:

1. Opaque quartz glass, having an apparent density ranging from 1.7 to 2.1 g/cm$^3$, containing bubbles having an average bubble diameter ranging from 10 to 100 $\mu$m in an amount ranging from $3\times10^5$ to $5\times10^6$ bubbles/cm$^3$, having a total bubble sectional area ranging from 10 to 40 cm$^2$/cm$^3$, and wherein the opaque quartz glass contains nitrogen element at a concentration ranging from 1 to 40 ppm.

2. The opaque quartz glass according to claim 1, wherein the linear transmittance of the opaque quartz glass is not higher than 3% at a thickness of 1 mm or larger to projected light of wavelength ranging from 300 to 900 nm.

3. A process for producing opaque quartz glass in a shape which does not require post-machining such as cutting, comprising packing into a heat-resistant mold a powdery source material composed of powdery silica having an average particle diameter ranging from 10 to 500 $\mu$m and powdery silicon nitride dispersed therein in an amount ranging from 0.001 to 0.05 part by weight based on 100 parts by weight of the powdery silica; heating the powdery source material up to a temperature of not lower than the melting temperature thereof and not higher than 1900° C. under vacuum, and further heating the source material up to another temperature higher than the melting point and not higher than 1900° C. in an inert gas atmosphere for vitrification and bubble formation.

4. A process for producing opaque quartz glass in a shape which does not require post-machining such as cutting, comprising packing into a heat-resistant mold a powdery source material composed of powdery silica having an average particle diameter ranging from 10 to 500 $\mu$m and powdery silicon nitride dispersed therein in an amount ranging from 0.001 to 0.05 part by weight based on 100 parts by weight of the powdery silica; heating the powdery source material up to a temperature of not lower than 1400° C. and lower than the melting temperature thereof under vacuum; and further heating the source material up to another temperature higher than the melting point and not higher than 1900° C. in an inert gas atmosphere for vitrification and bubble formation.

5. The process for producing opaque quartz glass according to claim 3 or 4, wherein the heat-resistant mold is in a shape of a flange, a cylinder, a hollow prism, a screw, a turbo-charger, a cubic water container, or a wash basin.

* * * * *